United States Patent [19]
Smith

[11] Patent Number: 5,935,668
[45] Date of Patent: Aug. 10, 1999

[54] WOODEN FLOORING STRIP WITH ENHANCED FLEXIBILITY AND STRAIGHTNESS

[75] Inventor: William S. Smith, Davidson, N.C.

[73] Assignee: Triangle Pacific Corporation, Dallas, Tex.

[21] Appl. No.: 08/905,364

[22] Filed: Aug. 4, 1997

[51] Int. Cl.$^6$ ........................................... B32B 3/00
[52] U.S. Cl. ............................ 428/40.1; 52/290; 52/391; 52/392; 52/539; 428/42.1; 428/43; 428/50; 428/106; 428/167; 428/192; 428/194; 428/537.1
[58] Field of Search .................. 428/40.1, 42.1, 428/43, 192, 194, 106, 167, 537.1, 50; 52/290, 391, 392, 539

[56] References Cited

U.S. PATENT DOCUMENTS

| | | | |
|---|---|---|---|
| 1,394,120 | 10/1921 | Rockwell | 144/350 |
| 1,778,333 | 10/1930 | Neumann | 52/730.7 |
| 2,139,880 | 12/1938 | Colucci | 428/53 |
| 2,491,498 | 12/1949 | Kahr | 52/592.1 |
| 2,725,910 | 12/1955 | Kahr | 52/592.1 |
| 2,900,676 | 8/1959 | Kahr | 52/592.1 |
| 3,016,316 | 1/1962 | Olson | 52/592.1 |
| 3,287,203 | 11/1966 | Elmendorf | 428/50 |
| 3,345,244 | 10/1967 | Stolessen et al. | 428/167 |
| 3,579,941 | 5/1971 | Tibbals | 52/384 |
| 3,847,647 | 11/1974 | Bahlo | 156/277 |
| 4,041,200 | 8/1977 | Boranian et al. | 428/40.1 |
| 4,388,788 | 6/1983 | Bosco | 52/390 |
| 4,471,012 | 9/1984 | Maxwell | 428/106 |
| 4,695,502 | 9/1987 | Rush | 428/92 |
| 4,731,140 | 3/1988 | Yontrarak | 156/154 |
| 4,784,887 | 11/1988 | Abendroth | 428/54 |
| 4,789,604 | 12/1988 | Van Der Hoeven | 428/503 |
| 4,906,497 | 3/1990 | Hellmann et al. | 428/49 |
| 5,109,898 | 5/1992 | Schacht | 144/350 |
| 5,283,102 | 2/1994 | Sweet et al. | 428/167 |
| 5,352,317 | 10/1994 | Traben et al. | 156/254 |
| 5,597,024 | 1/1997 | Bolyard et al. | 144/369 |
| 5,605,767 | 2/1997 | Fuller et al. | 428/514 |
| 5,609,915 | 3/1997 | Fuller et al. | 427/297 |

FOREIGN PATENT DOCUMENTS

| | | |
|---|---|---|
| 1198883 | 8/1984 | Argentina . |
| 1201246 | 3/1985 | Argentina . |
| 3700799A1 | 7/1988 | Germany . |
| 154091 | 7/1932 | Switzerland . |
| 328341 | 4/1958 | Switzerland . |
| WO89/01857 | 3/1989 | WIPO . |

OTHER PUBLICATIONS

Wood & Wood Products, "Wood Tile Firm Improves Product with New Adhesive System," All Pages, Oct. 1988.
Bruce Hardwood Floors, "How To Install," All Pages, 1992.
Premier Wood Floors And The Wood Wizard Present, "Wood Magic," pp. 11–15, 35–40, 47–48, 58–63, and 80–85; Jan. 15, 1995.
Bruce Hardwood Floors, "Installers Handbook," pp. 6, 7, 56–58, and 62; 1994.

*Primary Examiner*—Nasser Ahmad
*Attorney, Agent, or Firm*—Adams Law Firm, P.A.

[57] ABSTRACT

A wooden flooring strip having a top surface having a decorative finish and a base surface opposed to said top surface. The base surface has a multiplicity of closely spaced-apart scores extending into the flooring strip from the base surface transverse to the length of the flooring strip along substantially the entire length of the flooring strip to relieve stress and increase flexibility in the wood strip for more closely adhering to irregularities of a sub-floor. The flooring strip has substantially longitudinally-extending wood fibers in an area of the flooring strip between the scores and the top surface of the flooring strip which have been broken to an extent sufficient to relieve tension on the top surface of the flooring strip and to equalize tension on the wood fibers adjacent both the top surface and base surface of the flooring strip.

16 Claims, 6 Drawing Sheets

WOODEN FLOORING STRIP WITH ENHANCED FLEXIBILITY AND STRAIGHTNESS

TECHNICAL FIELD AND BACKGROUND OF THE INVENTION

This invention relates a flooring strip with increased flexibility and straightness, such as laminated hardwood flooring strips assembled to form a hardwood floor. The invention has particular application to glue-down prefinished wood flooring products. Wooden flooring is typically installed by either nailing strips of adjacent wood flooring strips to a subfloor to form an essentially seamless wooden flooring surface, by applying wood flooring strips to a subfloor which has been pre-coated with, for example, a mastic-type layer into which the flooring strips are embedded, or by applying wooden strips with pre-applied adhesive on the base to the subfloor.

Applicant has heretofore developed a prefinished hardwood strip flooring product which can be adhered by an adhesive directly to a suitable subfloor, and which will serve with the same durability and longevity as other, more expensive wood flooring systems. This flooring product has the same solid "feel" as a full thickness, solid hardwood floor of the type typically nailed into place, without any of the "spring" or "bounce" which characterizes prior art glue-down flooring systems which rely on relatively thick foam adhesive pads to adhere the system to the subfloor.

A substantial disadvantage observed in prior art flooring products is the tendency of the flooring strips to pull away from the subfloor, particularly at points where there may be slight irregularities in the subfloor surface. A very straight, rigid flooring strip will pull away from the subfloor more readily than a thin, flexible flooring strip. This can occur with any type of flooring product. The problem may be aggravated when the flooring strip as manufactured has a bow along its length such that the base surface of the strip creates a concavity when laid on a flat surface. This problem has been resolved to a considerable extent by prior developments such as disclosed in applicant's prior U.S. Pat. No. 5,283,102. The hardwood flooring strip disclosed in the '102 Patent includes a multiplicity of closely-spaced transverse scores in the base of the flooring strip. These scores substantially increase the flexibility of the flooring strips without affecting in any way the appearance of functionality of the product. However, scoring the back of the flooring strip causes bowing by relieving tension on one side of the flooring strip while less the tension on the opposite side substantially unchanged. This bowing affects downstream processing and packaging of the flooring strips. In addition, the installer must take the bow into account in cutting and installing the flooring strips. While the problems are manageable, it is nevertheless desirable to provide to the installer a flooring strip that is essentially straight. Apart from the functional reasons for doing this, a perfectly straight flooring strip is aesthetically more akin to solid, full thickness hardwood flooring strips and thus more appealing to the customer.

The product according to the application as illustrated in this application includes a foam-type adhesive system positioned on the back side. The flooring strip is faster, easier and less expensive to install than either an unfinished nail-down flooring system or a flooring system laid into a pre-applied mastic layer. The product has particular application in the flooring aftermarket for use by "do-it-yourself" homeowners who want the expensive look of high quality hardwood flooring without the disruption resulting from a contractor-installed floor. There is presently a trend back towards the use of hardwood flooring, and many homeowners are removing existing carpeting in order to replace it with hardwood flooring. A flooring system which can be installed onto a subfloor onto which a carpet was previously installed without the need to raise doors and moldings to accommodate a greater thickness is desirable, since it simplifies the do-it-yourself installation process.

The flooring strip according to this application address those needs and, in addition, is very flexible, strong and straight. By straightening the flooring strips, the quality and functionality of the product is increased. By removing the bow in the flooring strip introduced by cutting scores in its back side, any residual tendency for the center of the flooring strip to pull away from the subfloor over time eliminated.

SUMMARY OF THE INVENTION

Therefore, it is an object of the invention to provide a hardwood flooring strip which is both flexible and straight.

It is another object of the invention to provide a hardwood flooring strip which can be bonded to a subfloor and which does not tend to pull away from the subfloor.

It is another object of the invention to provide a flooring system which can be installed easily by do-it-yourself installers.

It is another object of the invention to provide a flooring system which is as durable as conventional wood flooring systems, such as nail-down flooring systems.

it is another object of the invention to provide a flooring system wherein the flooring strips have no residual bowing which might cause eventual separation of the flooring strip from the subfloor.

It is another object of the invention to provide a flooring system which, after installation, is indistinguishable in appearance and serviceability from conventional wood flooring systems, such as nail-down flooring systems.

It is another object of the invention to provide a flooring system which is sufficiently low profile so that it can be installed on subfloors where carpet was previously installed without raising the doors and moldings.

It is another object of the invention to provide a flooring system which can be installed over a wide variety of subfloors without extensive preparation.

It is another object of the invention to provide a flooring system which is aggressively bonded to the subfloor.

These and other objects of the present invention are achieved in the preferred embodiments disclosed below by providing a wooden flooring strip having a top surface having a decorative finish and a base surface opposed to said top surface. The base surface has a multiplicity of closely spaced-apart scores extending into the flooring strip from the base surface transverse to the length of the flooring strip along substantially the entire length of the flooring strip to relieve stress and increase flexibility in the wood strip for more closely adhering to irregularities of a sub-floor. The flooring strip has substantially longitudinally-extending wood fibers in an area of the flooring strip between the scores and the top surface of the flooring strip which have been broken to an extent sufficient to relieve tension on the top surface of the flooring strip and to equalize tension on the wood fibers adjacent both the top surface and base surface of the flooring strip.

According to one preferred embodiment of the invention, the wooden flooring strip includes locking means extending along the length of said flooring strip on first and second opposed side edges for locking adjacent flooring strips together side-to-side to form an assembled wood floor. The locking means comprises a tongue formed on said first side edge of the flooring strip and a groove formed in the second side edge of the flooring strip. Each of the tongue and grooves mate complementary elements on adjacent flooring strips.

According to another preferred embodiment of the invention, the wooden flooring strip includes flooring strips having opposing end portions, the end portions each having a single flat area encompassing the entire end portion surface area perpendicular to the plane of the flooring strip for abutting engagement with like flat areas on adjacent flooring strips.

According to yet another preferred embodiment of the invention, the wooden flooring strip includes at least one strip of pressure sensitive adhesive-coated foam tape applied to the base surface for adhering said flooring strip to the subfloor, and includes a protective cover covering said adhesive until removal just prior to installation to the subfloor.

According to yet another preferred embodiment of the invention, the wooden flooring strip includes a top surface having a decorative finish and a base surface opposed to said top surface. The base surface has a multiplicity of closely spaced-apart scores extending into the flooring strip from the base surface transverse to the length of the flooring strip along substantially the entire length of the flooring strip to relieve stress and increase flexibility in the wood strip for more closely adhering to irregularities of a sub-floor. The flooring strip is characterized by having substantially longitudinally-extending wood fibers in an area of the flooring strip between the scores and the top surface of the flooring strip which have been broken to an extent sufficient to relieve tension on the top surface of the flooring strip and to equalize tension on the wood fibers adjacent both the top surface and base surface of the flooring strip. Locking means extend along the length of said flooring strip on first and second opposed side edges for locking adjacent flooring strips together side-to-side to form an assembled wood floor, such as a tongue formed on said first side edge of the flooring strip and a groove formed in the second side edge of the flooring strip, each of which mate with complementary elements on adjacent flooring strips. The flooring strips have opposing end portions, said end portions each having a single flat area encompassing the entire end portion surface area perpendicular to the plane of the flooring strip for abutting engagement with like flat areas on adjacent flooring strips. At least one strip of pressure sensitive adhesive-coated foam tape is applied to the base surface for adhering said flooring strip to the subfloor, and including a protective cover covering said adhesive until removal just prior to installation to the subfloor.

According to yet another preferred embodiment of the invention, the foam tape includes adhesive on said tape for adhering the tape to the base surface of the flooring strip.

Preferably, the foam tape comprises an closed cell polyethylene foam.

According to yet another preferred embodiment of the invention, the adhesive comprises an acrylate pressure sensitive adhesive.

According to yet another preferred embodiment of the invention, the flooring component is selected from the group consisting of solid wood strip, laminated wood strip, solid parquet block or laminated parquet block.

According to yet another preferred embodiment of the invention, the adhesive layer is positioned on the base surface of the flooring strip in spaced-apart relation to both side edges for providing an attachment interface surface for adhering the flooring component to the subfloor while permitting interconnection of the flooring strip with an adjacent, like flooring strip without contact of the adhesive with the subfloor.

According to yet another preferred embodiment of the invention, the flooring strip includes a top layer, an intermediate layer and a base layer laminated together in registration with each other.

According to yet another preferred embodiment of the invention, the scores in the flooring strip are formed by scoring the base layer of the flooring strip.

According to yet another preferred embodiment of the invention, the scores in the flooring strip are formed by adhering a plurality of spaced-apart wood pieces in an array to the intermediate layer.

According to yet another preferred embodiment of the invention, the flooring strip includes two spaced-apart and parallel lengths of foam tape extending along the length of the flooring strip.

According to yet another preferred embodiment of the invention, the adhesive layer is positioned on the base surface of the flooring strip in spaced-apart relation to both side edges for providing an attachment interface surface for adhering the flooring component to the subfloor while permitting interconnection of the flooring strip with an adjacent, like flooring strip without contact of the adhesive with the subfloor.

According to yet another preferred embodiment of the invention, the flooring strip includes a top surface having a decorative finish, a base surface opposed to said top surface, said flooring strip having substantially longitudinally-extending wood fibers in an area of the flooring strip between the base surface and the top surface of the flooring strip which have been broken to an extent sufficient provide enhanced flexibility to said flooring strip and to equalize tension on the wood fibers adjacent both the top surface and base surface of the flooring strip, whereby the flooring strip lies flat without bowing and has an enhanced tendency to remain flat when bonded to a subfloor having surface irregularities.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
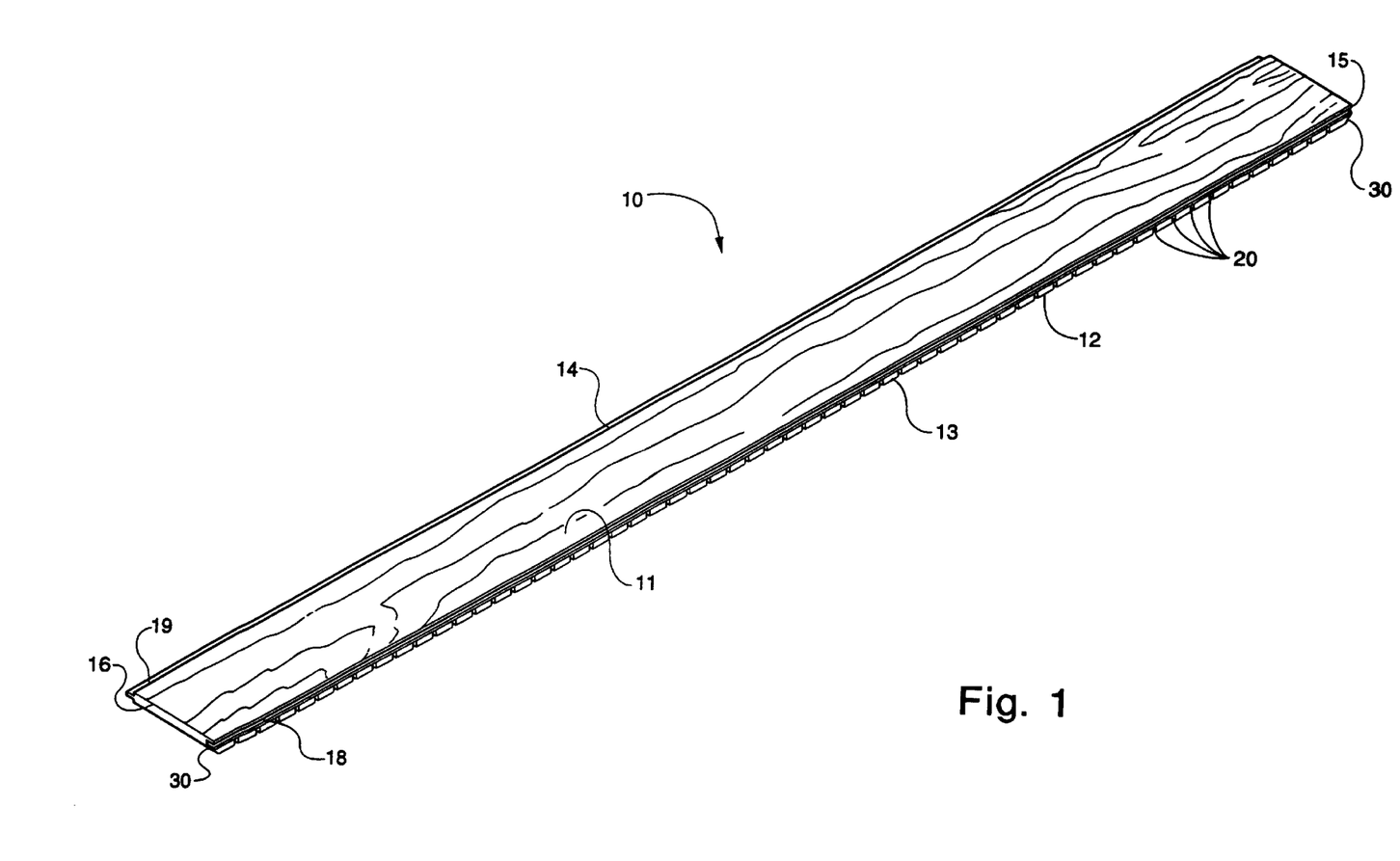
FIG. 1 is a perspective view of the finished side of a flooring strip according to a preferred embodiment of the present invention.

Referring now specifically to the drawings, a flooring strip according to the present invention is illustrated in FIG. 1 and shown generally at reference numeral 10.

Flooring strip 10 may be any suitable length, width and thickness, but typical sizes and constructions are 1/4th, 3/8ths and 15/16ths-inch thick laminated or solid oak flooring strips between 2 and 1/4th and 8 inches wide and up to 5 feet long. A three-layer laminated construction is shown in the Figures. See particularly FIG. 3.

Flooring strip 10 has a top surface 11, which may be finished or unfinished, an opposite base surface 12, opposed side edges 13 and 14 and end edges 15 and 16. The flooring strip 10 includes a groove 18 which extends along side edge 13 and a mating tongue 19 which extends along the opposite side edge 14. Grooves 18 and tongues 19 of adjacent flooring strips mate to form a substantially seamless floor.

Figure 2:
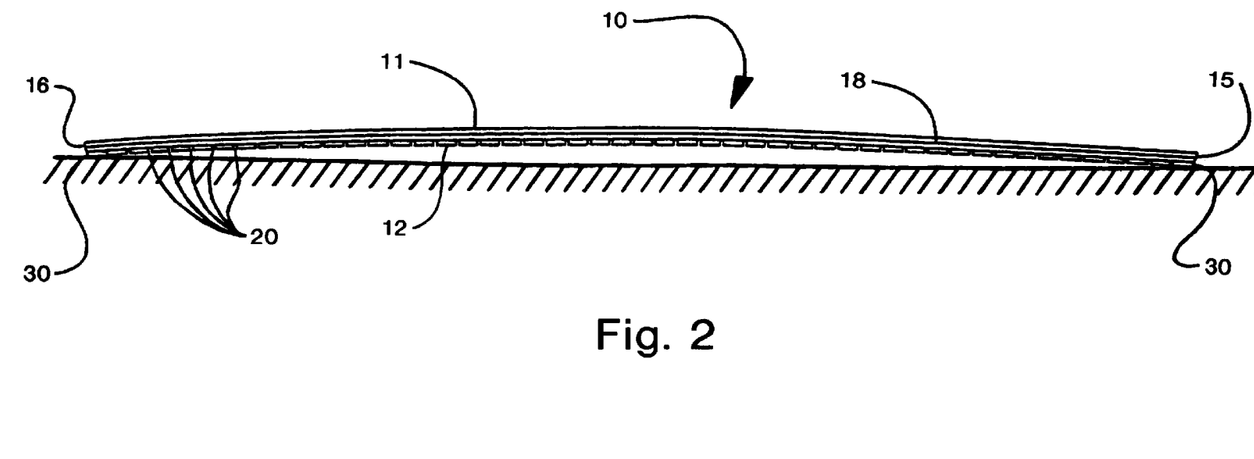
FIG. 2 is a side elevation of the flooring strip in FIG. 1, illustrating the bow which is formed in the strip when the scores are scored into the base surface.
Figures 3, 4:
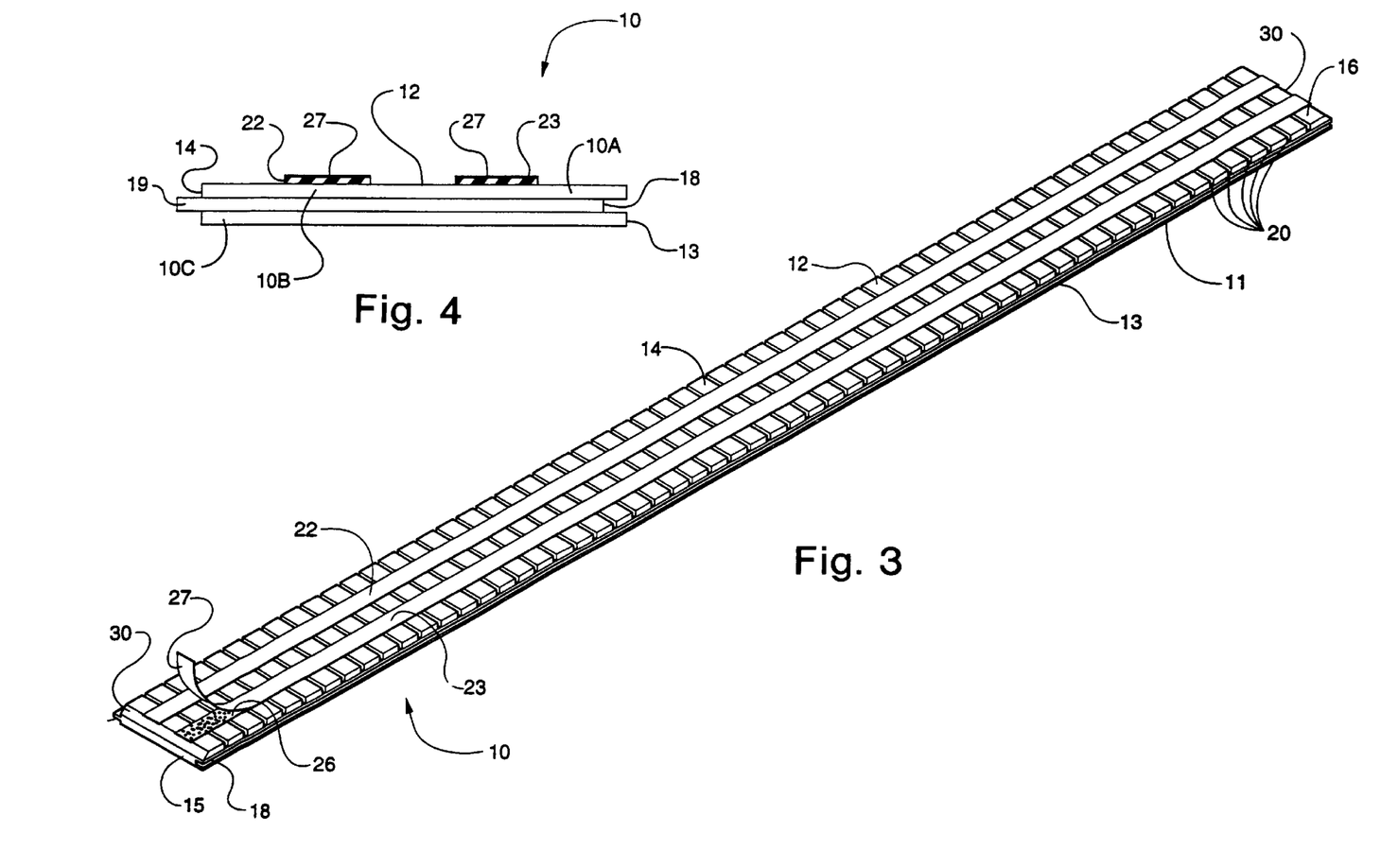
FIG. 3 is a perspective view of the unfinished side of the flooring strip shown in FIG. 1.
FIG. 4 is an enlarged, vertical cross-sectional view laterally through the flooring strip.

As is shown in FIGS. 2 and 4, the base surface 12 is provided with transverse scores 20. The scores 20 extend from side to side in closely spaced-apart relation transverse to the length of the flooring strip 10 along substantially the entire length of the of the flooring strip 10, substantially as disclosed in applicant's U.S. Pat. No. 5,283,102. In accordance with a preferred embodiment of the invention, the scores 20 are 1/8th inch wide, 1/8th inch deep, and are spaced-apart one inch on center. Other widths, depths and spacings are also possible.

The scores 20 substantially increase the flexibility of the flooring strip 10 and thus improve the capacity of the flooring strip 10 to remain completely bonded to the subfloor along its entire length. However, the relief afforded the stress in the wood adjacent the base surface 12 can cause bowing of the flooring strip 10, as shown in FIG. 2. An upward deflection of the flooring strip 10 at a point equidistant its opposite ends from a flat supporting surface may be approximately 3/4 inch.

As is shown in FIG. 3, the flooring strip 10 according to one preferred embodiment of the invention is a laminate structure having three wood layers, 10A, 10B, 10C bonded together under heat and pressure. According to one embodiment of the invention, the top layer 10A is a thin veneer layer of solid, unblemished, high quality wood, such as oak, while the middle and base layers 10B and 10C are either blemished strips of the same type of wood, or a less expensive type of wood. In embodiments wherein blemished wood is used on the base layer 10C.

The embodiment of the flooring strip 10 disclosed in this application includes a pressure-sensitive adhesive system, as described below. However, the apparatus and method according to the application has application to any flooring strip which is bowed, for whatever reason.

Figure 5:
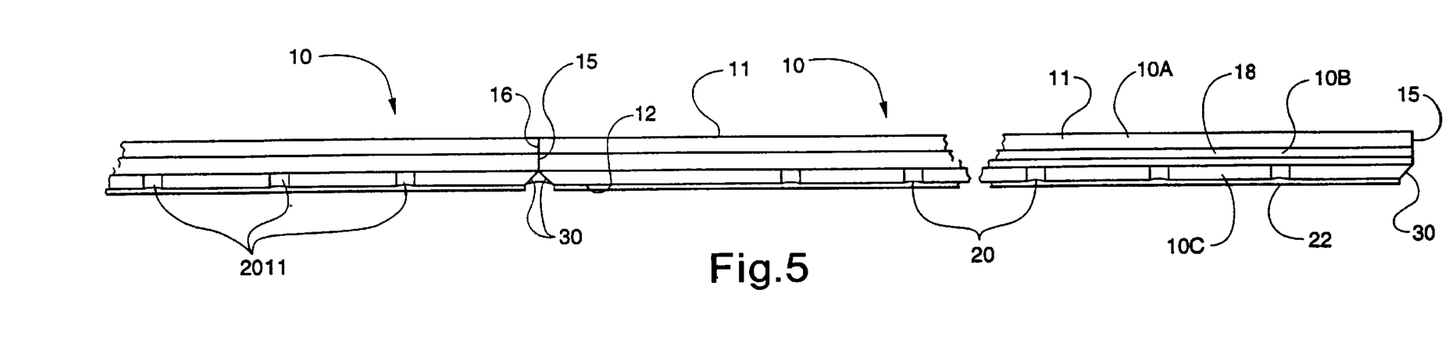
FIG. 5 is a fragmentary side elevation of the flooring strip.

Two tape strips 22 and 23 of a pressure sensitive foam adhesive system are adhered to the base surface 12 of flooring strip 10, as is shown in FIG. 4. The adhesive tape strips 22 and 23 are applied in lengthwise-extending lengths from one end of the flooring strip 10 to the other. See generally also FIGS. 3, 4 and 5.

Figure 6:
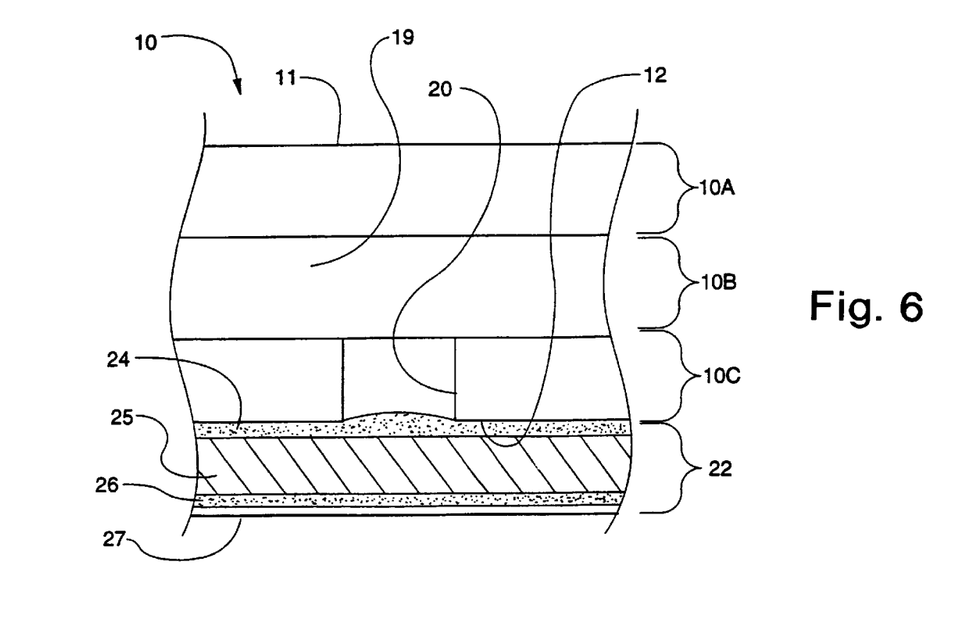
FIG. 6 is a fragmentary, enlarged, vertical cross-sectional view longitudinally through the flooring strip.

As is best shown in FIG. 6, each of the adhesive system tape strips 22 and 23 (exemplified by tape strip 22) is a laminated assembly including a first acrylate adhesive layer 24 by which the assembly is bonded to the flooring strip 10. One side of a polyethylene foam tape layer 25 provides a substrate to support and carry the adhesive layer 24, and simultaneously provides a suitable degree of cushioning to the flooring strips 10 upon installation to form a floor. The other side of the foam tape layer 25 supports a second acrylate adhesive layer 26 which remains covered by a release paper 27 and protects the adhesive layer 26 until the flooring strip 10 is ready to be applied to the subfloor, as which time it is removed as described below.

The preferred pressure sensitive system as generally described above is a double-coated polyethylene foam tape, Product Description Nos. 4492, manufactured by Minnesota Mining and Manufacturing Company. The adhesive applied to the polyethylene foam is an acrylate adhesive possessing an aggressive adherence capacity.

The preferred thickness of the adhesive system is 1/32 inch. According to one preferred method, the adhesive tape strips 22 and 23 are supplied by the manufacturer in a long, continuous strip on a roll, which includes a release paper or film (not shown) which protects the adhesive which will bond with the base surface 12 until application of the tape strips 22 and 23 to the base surface 12 of the flooring strip 10. The base surface 12 is sanded with a belt sander carrying 150 grit sandpaper, and then heated to approximately 125–135° F. The heating softens the adhesive as it contacts the wood and creates a more intimate bond.

The release paper is removed and the adhesive layer exposed as the strips of tape are pressed onto the base surface of the flooring strip 10.

The strips are preferably spaced from both side edges 13 and 14 of the flooring strip 10, leaving bare wood on both side edges and the adjacent portions of the base surface 12 of the flooring strip 10. Preferably, each of the tape strips 22 and 23 are 3/4 inches wide and are symmetrically offset relative to the centerline of the flooring strip 10. This provides a centered length of bare wood extending along the length of the flooring strip 10 between tape strips 22 and 23, and two lengths of bare wood, each 1/8 inch wide, extending along the opposing side edges 13 and 14.

Other configurations are possible, and are optimized depending on the thickness, width and flexibility of the flooring strips, and the anticipated subfloor characteristics. In some applications a single, wider adhesive tape strip or three or more parallel strips may be more suitable.

The opposing ends 15 and 16 of the wood flooring strip 10 are formed without tongue and groove locking means, but are cut to provide a abutting connection between the end 15 and the end 16 of adjacent laminated wood flooring strips 10. The abutting ends 15 and 16 of the laminated wood flooring strip 10 permit an absolutely flush joint which will not pull open. A chamfer 30 is formed at both ends 15 and 16 in the base layer 10C of the wood flooring strip 20. The chamfers 30 each form an undercut area adjacent the lower edge of the ends 15 and 16. The chamfers 30 allow the wood flooring strip 10 to flex freely in conformity with the surface of the subfloor, without effecting or otherwise interfering with the placement of adjacent laminated wood flooring strips 10. For this reason, adjacent, end-to-end laminated wood flooring strips 10 can be made to lie perfectly flush edge-to-edge, without using tongue and groove or other locking means. The ability to eliminate the tongue and groove locking means on the ends 15 and 16 of the flooring strip 10 simplifies installation, since each strip 10 can be placed onto the subfloor in exact endwise alignment with the end 15 of one flooring strip 10 flush against the end 16 of an adjacent flooring strip 10. Thus, the flooring strip 10 need only be shifted sideways to lock the tongue 19 of one flooring strip 10 into the groove 18 of the laterally adjacent flooring strip 10.

The provision of abutting end engagement between end-to-end adjacent laminated wood flooring strips 20 provides a much smoother and more consistent floor surface, because the side edge tongue and groove connections 19 and 18 hold the ends 15 and 16, as well as the sides, level. Furthermore, the flooring strip 10 as described in the above embodiment can be cut to length and pieced anywhere on the floor, since a tongue and groove or other positive locking means is no longer necessary to lock the ends 15 and 16 together with adjacent laminated wood flooring strips 10. Note particularly that the end edges 15 and 16 above the chamfer 30 are flat and perpendicular to the plane of the top and base surfaces 11 and 12, so that no gap remains when end-to-end flooring strips 10 are mated.

Figure 9:
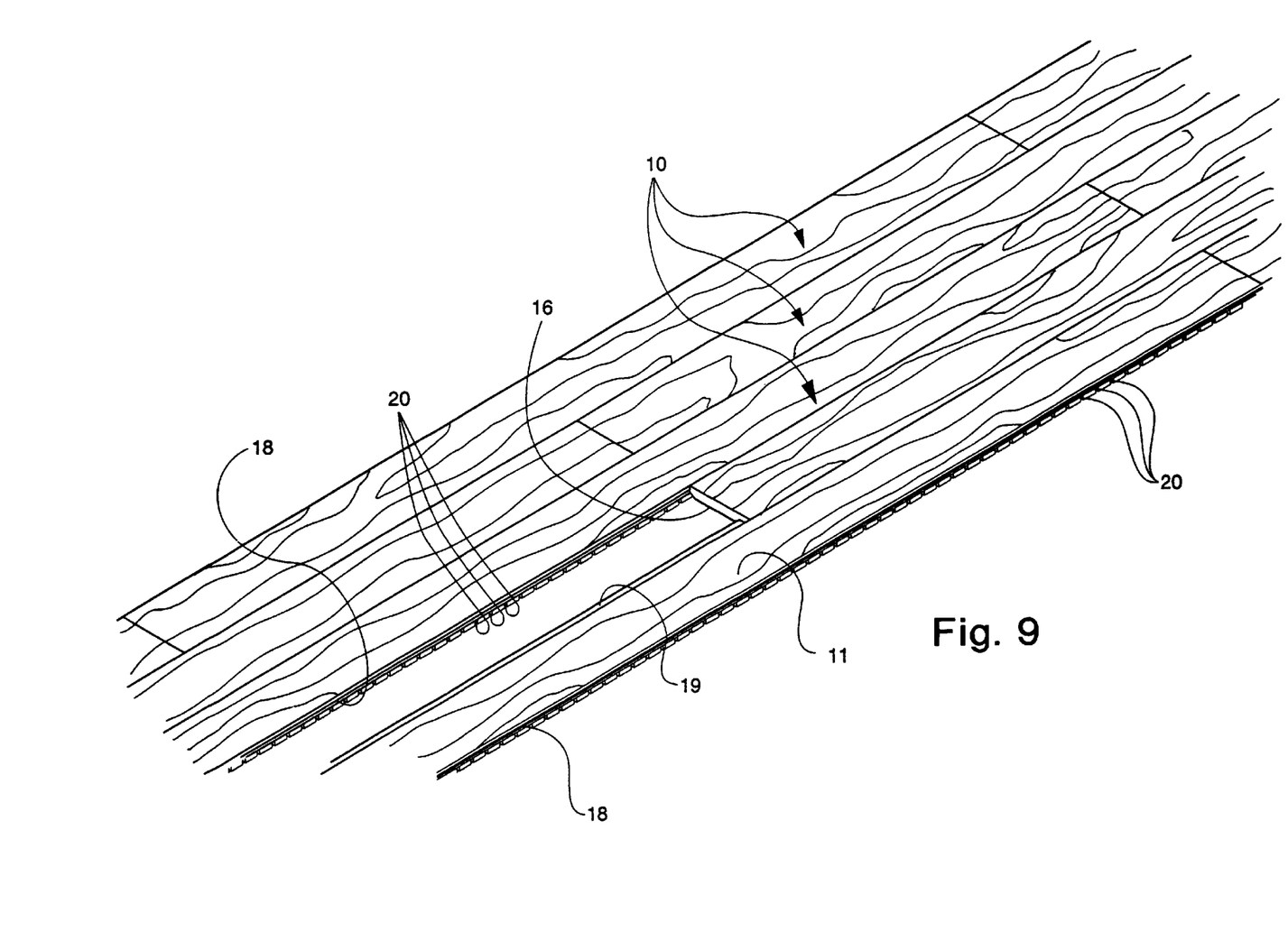
FIG. 9 is a perspective view of a floor created from assembled flooring strips according to an embodiment of the invention.

As is shown in FIG. 9, installation of the flooring strip 10 as described more specifically below creates a finished hardwood floor indistinguishable from other floors which are more expensive and difficult to install.

The strength of the adhesive and the bond between the adhesive, the wood and the subfloor has been tested by preparing a test sample by applying a flooring strip to a section of conventional subflooring material to create a test assembly. A ten-pound weight was attached to the flooring strip to apply a vertical pull. The test assembly has withstood several months of such pull without delamination of either the flooring strip 10 from adhesive or the subfloor.

Flooring strip 10 may be applied to a number of different subfloor constructions, such as plywood, oriented strand board or 40 pound particle board. The floor can also be installed over existing floors. If the existing floor is a wood floor, all wax must be removed, since the adhesive is designed not to stick to waxed surfaces—hence the use of a wax-coated release paper. Polyurethane-finished floors need not be stripped as long as the finish is well bonded. Vinyl-type flooring can be used so long as the wear layer is intact and has a PVC or Polyurethane wear layer. The floor can be installed over a concrete subfloor if clean and dust-free. This condition can be achieved by carefully sweeping or vacuuming the floor.

Plaster dust and similar materials prevent the adhesive from adhering to the subfloor, so cleaning to remove these and similar materials is very important.

DESCRIPTION OF APPARATUS AND METHOD

Figure 7:
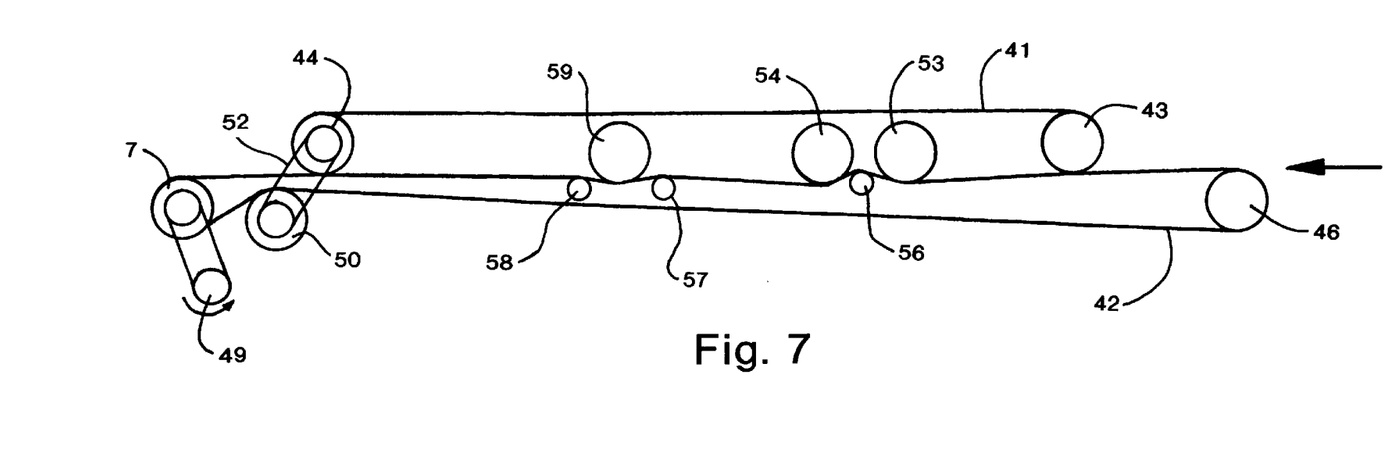
FIG. 7 is a simplified side elevation schematic of the apparatus for increasing the flexibility of and straightening flooring strips according to an embodiment of the invention.

Referring now to FIG. 7, an apparatus 40 for straightening and increasing the flexibility of flooring strips such as those described above is shown. Apparatus 40 includes an upper conveyor belt 41 and a lower conveyor belt 42. The upper conveyor belt 41 rotates around two horizontally spaced-apart rollers 43 and 44. the lower conveyor belt 42 rotates around two horizontally spaced-apart rollers 46 and 47 positioned beneath the upper conveyor belt 41 with the upper run of the lower conveyor belt 42 and the lower run of the upper conveyor belt 41 engaging each other as each of the belts 41 and 42 rotate. The lower conveyor belt 42 is longer and the upper conveyor belt 41 and, as is shown in FIG. 7, extends outwardly in the infeed direction to form a support for the flooring strips 10 as they are fed into the apparatus 40. Both conveyor belts 41 and 42 are fabricated of rubber with gripping fingers molded into the surfaces. All rollers have polished steel surfaces.

Both belts 41 and 42 are driven by an electric motor 49. Motor 44 drives roller 47 of the lower conveyor belt 42 as shown in FIG. 7. An adjustable tension roller 50 is used to control the tension on the lower conveyor belt 42 and drives the roller 44 of the upper conveyor belt 41 by means of a suitable drive belt 52, such as a timing belt.

Still referring to FIG. 7, a pair of deflection rolls 53, 54 are positioned in spaced-apart position between the upper and lower runs of the upper conveyor belt 41. An adjustable deflection roll 56 is positioned in spaced-apart position between the upper and lower runs of the lower conveyor belt 42 between the deflection rolls 53, 54. The deflection roll 56 is urged upwardly and deflects the upper and lower conveyor belts 41 and 42 upwardly between the deflection rolls 53, 54. The short length of the conveyor belts 41, 42 between the deflection rolls 53, 54 thus forms a deflection zone through which the flooring strips 10 must pass.

Preferably, a second pair of deflection rolls 57, 58 are positioned in spaced-apart position between the upper and lower runs of the lower conveyor belt 42. An adjustable deflection roll 59 is positioned in spaced-apart position between the upper and lower runs of the upper conveyor belt 41 between the deflection rolls 57, 58. The deflection roll 59 is urged downwardly and deflects the upper and lower conveyor belts 41 and 42 downwardly between the deflection rolls 57, 58. The short length of the conveyor belts 41, 42 between the deflection rolls 57, 58 thus forms a second deflection zone through which the flooring strips 10 must also pass.

Figure 8:
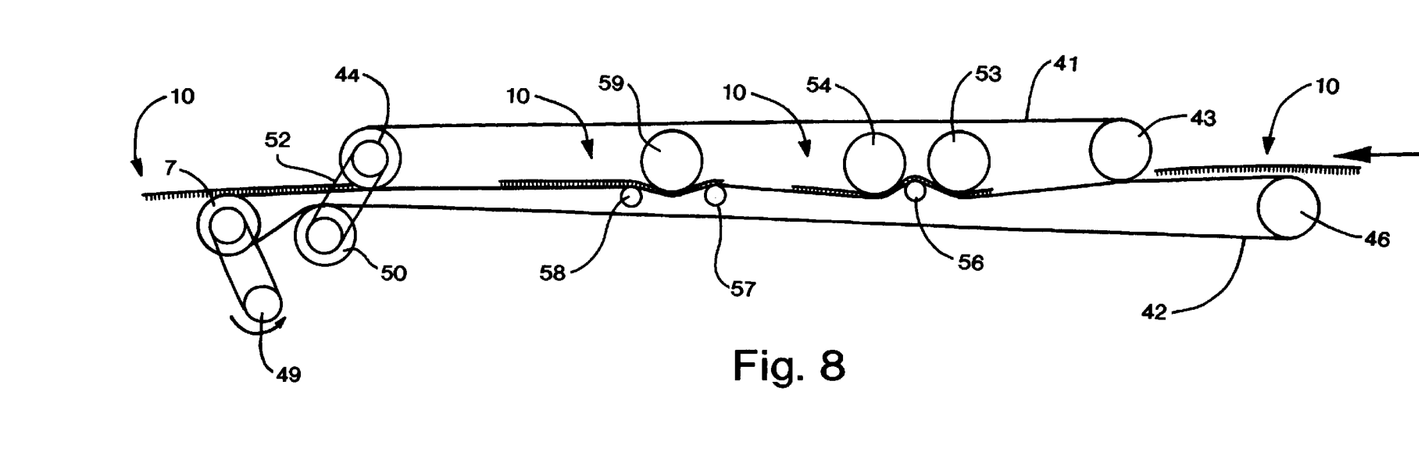
FIG. 8 is a view similar to FIG. 7 showing flooring strips being processed.

Apparatus 40 is positioned downstream from the molder, and the alreadyscored flooring strips are fed one-by-one onto the upper run of the lower conveyor belt, as is shown in FIG. 8. The conveyors feed the flooring strips 10 at 240 ft/min—the same speed as the molder. The flooring strips 10 made be fed into the apparatus 40 with either side facing up. By providing two deflection zones formed by the deflection rolls 53, 54, 56 and 57, 58, 59, respectively, even and symmetrical bending of the flooring strips 40 is insured As noted above, the flooring strips 10 may typically have a bow or deflection of ¾ inch. It has been determined that this degree of deflection can be adequately corrected by an apparatus 40 wherein the deflection rollers 53 and 54 are 6 inches in diameter and 8 inches apart center-to-center, and the deflection roll 56 is 2 inches in diameter and deflects the conveyor belts 41 and 42 one inch upwardly. The deflection rollers 57 and 58 are also 8 inches apart center-to-center and 2 inches in diameter. The deflection roll 59 is 8 inches in diameter and deflects the conveyor belts 41 and 41 one inch downwardly. As is shown in FIG. 8, the deflection between the rollers 57 and 58 is more gradual that the deflection between the rollers 53 and 54.

As the flooring strip 10 passes though the apparatus 40 the wood fibers between the scores 20 are broken. Testing has shown that floorings strips 10 processed through the apparatus 40 lie completely flat and have enhanced flexibility. As a result, the flooring strips 10 have no tendency to pull away from the subfloor after installation, as is the case with floorings strips 10 not processed through the apparatus 40.

The principles by the which the apparatus 40 operates can be applied to different sizes, types, thicknesses and materials of flooring strips. Empirical testing is necessary is determine the correct machine speed, roller spacing, roller diameter and other variables to break the fibers in the flooring strip to the extent necessary to relieve and equalize tension while not breaking so many fibers that the flooring strip is structurally damaged.

INSTALLATION METHOD

Flooring strips 10 processed as described above through apparatus 40 are installed as follows:

A chalk line, framing square, and a miter saw are usually the only tools needed for installation. In most cases, rolling is not necessary. The flooring is adequately adhered by pressure applied as workers walk back and forth over the flooring as it is applied.

A 5% cutting allowance is usually sufficient. The subfloor should be checked for damage, levelness and cleanliness, and corrected if necessary.

First, the installer finds starting point depending on pattern and chalk line in a conventional manner. A "dry" fit of the flooring strip 10 is made to determine necessary cuts. The ends are measured before removing the release paper 27, the ends are dry fitted, then cut, then the release paper 27 is removed to expose the adhesive and the flooring strip 10 is carefully pressed onto the subfloor. The flooring strip 10 is applied to the subfloor along a chalk line, with the groove 18 on the chalk line, and the tongue 19 away from the installer. Other cuts around heat registers, pipes and the like are made as the flooring strips 10 are installed, and before removal of the release paper 27, as described above.

As noted above, marginal areas of the base surface of the flooring strips 10 are not covered with adhesive tape strips 22 and 23. Release paper 27 is removed and the tongue 19 of the flooring strip 10 is introduced into the groove 18 of the adjacent flooring strip 10 at an angle. The absence of adhesive on the marginal area of the base surface 12 adjacent the tongue 19 permits placement of the flooring strip 10 very closely adjacent to the just-laid flooring strip 10 without the just-exposed adhesive contacting the subfloor. The tongue 19 can therefore be inserted completely into the adjacent groove 18 and the flooring strip 10 pressed firmly onto the subfloor in a single motion. The adhesive layer 26 is sufficiently tenacious that the flooring strip should be very substantially in its final position before being pressed to the subfloor. If needed, the flooring strip 10 can be tapped, taking care not to damage the top surface edges, in order to position it seamlessly next to its adjacent flooring strip 10. The thickness of the tape strip 22 provides a minimal amount of lateral movement.

Shoe molding, radiator pipe flanges and heat register covers are reinstalled. The entire floor is rolled after installation of the flooring strips 10, and the installation is complete.

A flooring strip is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A wooden flooring strip, comprising:
   (a) a top surface having a decorative finish;
   (b) a base surface opposed to said top surface, said base surface having a multiplicity of closely spaced-apart scores extending into the flooring strip from the base surface transverse to the length of the flooring strip along substantially the entire length of the flooring strip to relieve stress and increase flexibility in the wood strip for more closely adhering to irregularities of a sub-floor; and
   (c) said flooring strip having substantially longitudinally-extending wood fibers in an area of the flooring strip between the scores and to and including the top surface of the flooring strip which have been broken to an extent sufficient to relieve tension on the top surface of the flooring strip and to equalize tension on the wood fibers adjacent both the top surface and base surface of the flooring strip.

2. A wooden flooring strip according to claim 1 and including locking means extending along the length of said flooring strip on first and second opposed side edges for locking adjacent flooring strips together side-to-side to form an assembled wood floor, said locking means comprising a tongue formed on said first side edge of the flooring strip and a groove formed in the second side edge of the flooring strip, each of said tongue and groove for mating connection with complementary elements on adjacent flooring strips.

3. A wooden flooring strip according to claim 1 and including said flooring strips having opposing end portions, said end portions each having a single flat area encompassing the entire end portion surface area perpendicular to the plane of the flooring strip for abutting engagement with like flat areas on adjacent flooring strips.

4. A wooden flooring strip according to claim 1 and including at least one strip of pressure sensitive adhesive-coated foam tape applied to the base surface for adhering said flooring strip to the subfloor, and including a protective cover covering said adhesive until removal just prior to installation to the subfloor.

5. A wooden flooring strip, comprising:
   (a) a top surface having a decorative finish;
   (b) a base surface opposed to said top surface, said base surface having a multiplicity of closely spaced-apart scores extending into the flooring strip from the base surface transverse to the length of the flooring strip along substantially the entire length of the flooring strip to relieve stress and increase flexibility in the wood strip for more closely adhering to irregularities of a sub-floor;
   (c) said flooring strip having substantially longitudinally-extending wood fibers in an area of the flooring strip between the scores and to and including the top surface of the flooring strip which have been broken to an extent sufficient to relieve tension on the top surface of the flooring strip and to equalize tension on the wood fibers adjacent both the top surface and base surface of the flooring strip;
   (d) locking means extending along the length of said flooring strip on first and second opposed side edges for locking adjacent flooring strips together side-to-side to form an assembled wood floor, said locking means comprising a tongue formed on said first side edge of the flooring strip and a groove formed in the second side edge of the flooring strip, each of said tongue and groove for mating connection with complementary elements on adjacent flooring strips;
   (e) said flooring strips having opposing end portions, said end portions each having a single flat area encompassing the entire end portion surface area perpendicular to the plane of the flooring strip for abutting engagement with like flat areas on adjacent flooring strips; and
   (f) at least one strip of pressure sensitive adhesive-coated foam tape applied to the base surface for adhering said flooring strip to the subfloor, and including a protective cover covering said adhesive until removal just prior to installation to the subfloor.

6. A flooring strip according to claim 4 or 5, wherein said foam tape includes adhesive on said tape for adhering the tape to the base surface of the flooring strip.

7. A flooring strip according to claim 4 or 5, wherein said foam tape comprises an closed cell polyethylene foam.

8. A flooring strip according to claim 4 or 5, wherein said adhesive comprises an acrylate pressure sensitive adhesive.

9. A flooring strip according to claim 1 or 5, wherein said flooring component is selected from the group consisting of solid wood strip, laminated wood strip, solid parquet block or laminated parquet block.

10. A flooring strip according to claim 5, wherein said adhesive layer is positioned on the base surface of the flooring strip in spaced-apart relation to both side edges for providing an attachment interface surface for adhering the flooring component to the subfloor while permitting interconnection of the flooring strip with an adjacent, like flooring strip without contact of the adhesive with the subfloor.

11. A flooring strip according to claim 1 or 5, wherein said flooring strip includes a top layer, an intermediate layer and a base layer laminated together in registration with each other.

12. A flooring strip according to claim 1 or 5, wherein the scores in the flooring strip are formed by scoring the base surface of the flooring strip.

13. A flooring strip according to claim 1 or 5, wherein the scores in the flooring strip are formed by adhering a plurality of spaced-apart wood pieces in an array to the intermediate layer.

14. A flooring strip according to claim 7, wherein the flooring strip includes two spaced-apart and parallel lengths of foam tape extending along the length of the flooring strip.

15. A flooring strip according to claim 10, wherein said adhesive layer is positioned on the base surface of the flooring strip in spaced-apart relation to both side edges for providing an attachment interface surface for adhering the flooring component to the subfloor while permitting interconnection of the flooring strip with an adjacent, like flooring strip without contact of the adhesive with the subfloor.

16. A wooden flooring strip, comprising:
(a) a top surface having a decorative finish;
(b) a base surface opposed to said top surface; and
(c) said flooring strip having substantially longitudinally-extending wood fibers in an area of the flooring strip between the base surface and to and including the top surface of the flooring strip which have been broken to an extent sufficient provide enhanced flexibility to said flooring strip and to equalize tension on the wood fibers adjacent both the top surface and base surface of the flooring strip, whereby the flooring strip lies flat without bowing and has an enhanced tendency to remain flat when bonded to a subfloor having surface irregularities.

* * * * *